(12) United States Patent
Stanhope

(10) Patent No.: US 12,538,863 B2
(45) Date of Patent: Feb. 3, 2026

(54) SYSTEM AND METHOD FOR DETERMINING ROW CLEANER AGGRESSIVENESS OF A SEED-PLANTING IMPLEMENT

(71) Applicant: CNH Industrial America LLC, New Holland, PA (US)

(72) Inventor: Trevor Stanhope, Oak Lawn, IL (US)

(73) Assignee: CNH Industrial America LLC, New Holland, PA (US)

( * ) Notice: Subject to any disclaimer, the term of this patent is extended or adjusted under 35 U.S.C. 154(b) by 750 days.

(21) Appl. No.: 17/886,611

(22) Filed: Aug. 12, 2022

(65) Prior Publication Data

US 2024/0049622 A1   Feb. 15, 2024

(51) Int. Cl.
*A01C 7/08*   (2006.01)
*A01C 5/06*   (2006.01)
*G01F 1/661*  (2022.01)

(52) U.S. Cl.
CPC .............. *A01C 7/08* (2013.01); *A01C 5/064* (2013.01); *G01F 1/661* (2013.01)

(58) Field of Classification Search
CPC ..... A01C 7/08; A01C 7/081; A01C 5/06–068; G01F 1/66–668
See application file for complete search history.

(56) References Cited

U.S. PATENT DOCUMENTS 6,956,348 B2   10/2005   Landry et al.
9,675,000 B2   6/2017    Wilson et al.
10,701,852 B2  7/2020    Calleija et al.
10,813,272 B2  10/2020   Stanhope
11,266,056 B2  3/2022    Nair et al.
2002/0131046 A1  9/2002  Christy et al.
(Continued)

FOREIGN PATENT DOCUMENTS

EP   3300570 A2      4/2018
JP   6845485 B2      3/2021
WO   WO2021/009261 A1   1/2021

OTHER PUBLICATIONS

Dille et al. "Outdoor Downward-facing Optical Flow Odometry with Commodity Sensors" Field & Service Robotics Jul. 2009 The Robotics Institute Carnegie Mellon University (10 pages) https://www.ri.cmu.edu/pub_files/2009/7/DilleFSR09.pdf.

*Primary Examiner* — Tara Mayo
(74) *Attorney, Agent, or Firm* — Dority & Manning P.A.

(57) ABSTRACT

A system for determining row cleaner aggressiveness of a seed-planting implement includes a row cleaner assembly having a row cleaner arm and a row cleaner wheel rotatably coupled to the row cleaner arm. Furthermore, the system includes an optical flow sensor configured to generate data indicative the movement of soil particles within a field across which the seed-planting implement is traveling relative to the seed-planting implement. Additionally, a computing system of the disclosed system includes is configured to determine a flow parameter associated with the movement of the soil particles relative to the seed-planting implement based on the data generated by the optical flow sensor. Furthermore, the computing system is configured to determine an aggressiveness parameter indicative of the amount of engagement between the row cleaner wheel and the surface of the field based on the determined flow parameter.

17 Claims, 6 Drawing Sheets

(56) References Cited

U.S. PATENT DOCUMENTS

| | | | |
|---|---|---|---|
| 2012/0291680 A1* | 11/2012 | Rylander | A01C 7/006 |
| | | | 111/139 |
| 2016/0134844 A1* | 5/2016 | Casper et al. | A01B 63/28 |
| | | | 348/135 |
| 2019/0254223 A1* | 8/2019 | Eichhorn et al. | A01B 63/16 |
| 2019/0297769 A1* | 10/2019 | Zielke et al. | A01B 63/008 |
| 2021/0158041 A1 | 5/2021 | Chowdhary et al. | |

* cited by examiner

SYSTEM AND METHOD FOR DETERMINING ROW CLEANER AGGRESSIVENESS OF A SEED-PLANTING IMPLEMENT

FIELD OF THE INVENTION

The present disclosure generally relates to seed-planting implements and, more particularly, to systems and methods for determining row cleaner aggressiveness of a seed-planting implement.

BACKGROUND OF THE INVENTION

Modern farming practices strive to increase yields of agricultural fields. In this respect, seed-planting implements are towed behind a tractor or other work vehicle to disperse seed throughout a field. For example, many seed-planting implements include several laterally spaced apart row units, with each row unit forming a row of planted seeds within the field. In this respect, each row unit typically includes a furrow opening assembly (e.g., a disk opener(s)) that forms a furrow or trench in the soil. Furthermore, each row unit generally includes a seed-dispensing device (e.g., a seed meter and associated seed tube) that deposits the seeds into the furrow. After deposition of the seeds, a furrow closing assembly (e.g., a pair of closing disks or wheels) may close the furrow in the soil.

In certain configurations, each row unit may include a row cleaner assembly positioned forward of the furrow opening assembly. In general, the row cleaner assembly is configured to break up and sweep away residue, dirt clods, trash, and other debris present within the path of the row unit. The aggressiveness which with the row cleaner assembly sweeps away the debris is an important parameter affecting its operation. For example, when the row cleaner assembly is not aggressive enough, debris may remain within the path of the row unit. Conversely, when the row cleaner assembly is too aggressive enough, the row cleaner assembly may sweep away the topsoil, thereby interfering with seed-planting operation. However, there are no current systems for determining the aggressiveness of a row cleaner assembly using agronomic feedback.

Accordingly, a system and method for determining row cleaner aggressiveness of a seed-planting implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a seed-planting implement. The seed-planting implement includes a toolbar and a plurality of row units supported on the toolbar. Each row unit includes a frame and a row cleaner assembly having a row cleaner arm pivotably coupled to the frame and a row cleaner wheel rotatably coupled to the row cleaner arm such that the row cleaner wheel is configured to roll relative to a surface of a field across which the seed-planting implement is traveling. Furthermore, each row unit includes an optical flow sensor configured to generate data indicative of a movement of soil particles within the field relative to the seed-planting implement. Additionally, the seed-planting implement includes a computing system communicatively coupled to the optical flow sensor of each row unit. In this respect, the computing system is configured to determine a flow parameter associated with the movement of the soil particles relative to the corresponding row unit based on the data generated by the corresponding optical flow sensor. Moreover, the computing system is configured to determine an aggressiveness parameter indicative of an amount of engagement between the row cleaner wheel and the surface of the field for each row unit based on the corresponding determined flow parameter.

In another aspect, the present subject matter is directed to a system for determining row cleaner aggressiveness of a seed-planting implement. The system includes a frame and a row cleaner assembly having a row cleaner arm pivotably coupled to the frame and a row cleaner wheel rotatably coupled to the row cleaner arm such that the row cleaner wheel is configured to roll relative to a surface of a field across which the seed-planting implement is traveling. In addition, the system includes an optical flow sensor configured to generate data indicative of a movement of soil particles within the field relative to the seed-planting implement and a computing system communicatively coupled to the optical flow sensor. As such, the computing system is configured to determine a flow parameter associated with the movement of the soil particles relative to the seed-planting implement based on the data generated by the optical flow sensor. Furthermore, the computing system is configured to determine an aggressiveness parameter indicative of an amount of engagement between the row cleaner wheel and the surface of the field based on the determined flow parameter.

In a further aspect, the present subject matter is directed to a method for determining row cleaner aggressiveness of a seed-planting implement. The seed-planting implement, in turn, includes a row cleaner assembly having a row cleaner arm pivotably coupled to a frame of the seed-planting implement. The row cleaner assembly further includes a row cleaner wheel rotatably coupled to the row cleaner arm. The method includes receiving, with a computing system, optical flow sensor data indicative of a movement of soil particles within a field across which the seed-planting implement is traveling relative to the seed-planting implement. Additionally, the method includes determining, with the computing system, a flow parameter associated with the movement of the soil particles relative to the seed-planting implement based on the received optical flow sensor data. Moreover, the method includes determining, with the computing system, an aggressiveness parameter indicative of an amount of engagement between the row cleaner wheel and the surface of the field based on the determined flow parameter. In addition, the method includes controlling, with the computing system, an operation of an actuator configured to adjust a position of the row cleaner wheel relative to the surface of the field based on the determined aggressiveness parameter.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
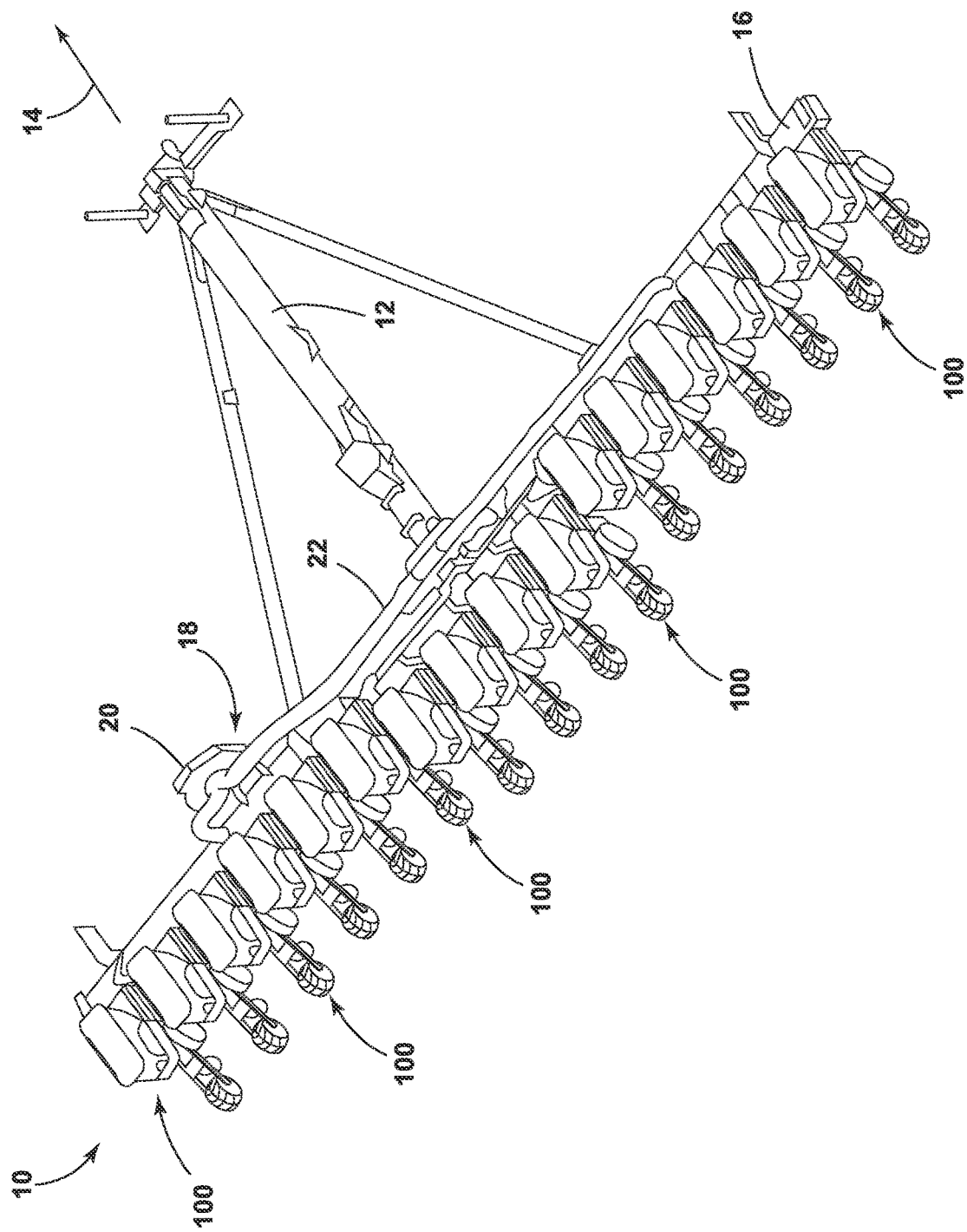
FIG. 1 illustrates a perspective view of one embodiment of a seed-planting implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for determining row cleaner aggressiveness of a seed-planting implement. As will be described below, a row cleaner assembly is positioned at forward end of a row unit of the seed-planting implement. In this respect, the row cleaner assembly is configured to break up and sweep away residue, dirt clods, trash, and other debris present within the path of the row unit. Specifically, the row cleaner assembly includes a row cleaner arm pivotably coupled to the frame of the row unit. Furthermore, the row cleaner assembly includes a row cleaner wheel rotatably coupled to the row cleaner arm such that the row cleaner wheel is configured to roll relative to the surface of the field. The aggressiveness which the row cleaner wheel sweeps away debris is based on the amount of engagement between the row cleaner wheel and the field surface. Thus, the row cleaner aggressiveness can be adjusted by moving the row cleaner wheel relative to the field surface.

In several embodiments, a computing system of the disclosed system is configured to determine the aggressiveness of the row cleaner assembly. More specifically, the computing system receives data indicative the movement of soil particles within the field relative to the seed-planting implement from an optical flow sensor. Additionally, the computing system determines a flow parameter associated with the movement of the soil particles relative to the seed-planting implement based on the received optical flow sensor data. For example, the flow parameter may correspond to a motion vector that is a composite of the movement of the soil particles within a field of view of the optical flow sensor. Moreover, the computing system determines an aggressiveness parameter indicative of an amount of engagement between the row cleaner wheel and the surface of the field based on the determined flow parameter. For instance, the aggressiveness parameter may correspond to the penetration depth of the tillage points of the row cleaner wheel into the field. Thereafter, the computing system may control the operation of an actuator configured to adjust the position of the row cleaner wheel relative to the surface of the field based on the determined aggressiveness parameter.

Determining the aggressiveness of a row cleaner assembly improves the operation of the seed-planting implement. More specifically, by quantifying the aggressiveness of the row cleaner assembly using agronomic feedback, namely the movement of soil particles relative to the implement, the position of the row cleaner wheel relative to the field surface can be controlled to provide optimal debris removal without also sweeping away the topsoil. In addition, the use of optical flow technology allows for the movement of soil particles to be tracked relative to the seed-planting implement uses significantly fewer computing resources than object classification algorithms. Thus, the use of optical flow technology allows the aggressiveness of the row cleaner assembly to be determined using minimal computing resources.

Referring now to the drawings, FIG. 1 illustrates a perspective view of one embodiment of a seed-planting implement 10. In the illustrated embodiment, the seed-planting implement 10 is configured as a planter. However, in alternative embodiments, the seed-planting implement 10 may generally correspond to any suitable seed-planting equipment or implement, such as seeder or another seed-dispensing implement.

As shown in FIG. 1, the seed-planting implement 10 includes a tow bar 12. In general, the tow bar 12 is configured to couple to a tractor or other agricultural vehicle (not shown), such as via a suitable hitch assembly (not shown). In this respect, the tractor may tow the seed-planting implement 10 across a field in a direction of travel (indicated by arrow 14) to perform a seed-planting operation on the field.

Furthermore, the seed-planting implement 10 includes a toolbar 16 coupled to the aft end of the tow bar 12. More specifically, the toolbar 16 is configured to support and/or couple to one or more components of the seed-planting implement 10. For example, the toolbar 16 is configured to support one or more seed-planting units or row units 100. As will be described below, each row unit 100 is configured to form a furrow having a selected depth within the soil of the field. Thereafter, each row unit 100 deposits seeds within the corresponding furrow and subsequently closes the corresponding furrow after the seeds have been deposited, thereby establishing rows of planted seeds.

In general, the seed-planting implement 10 may include any number of row units 100. For example, in the illustrated embodiment, the seed-planting implement 10 includes sixteen row units 100 coupled to the toolbar 16. However, in other embodiments, the seed-planting implement 10 may include six, eight, twelve, twenty-four, thirty-two, or thirty-six row units 100.

Additionally, in some embodiments, the seed-planting implement 10 includes a vacuum system 18. In general, the vacuum system 18 is configured to supply vacuum pressure to the individual row units 100. As such, the vacuum system 18 may include a fan or other pressurized air source 20 and a plurality of vacuum conduits 22 extending between the fan 20 and the row units 100. In this respect, the pressurized air generated by the fan 20 may be used to pick up seeds onto the seed meters (not shown) of the individual row units 100. However, the seeds may be provided to the row units 100 in any other suitable manner.

Figure 2:
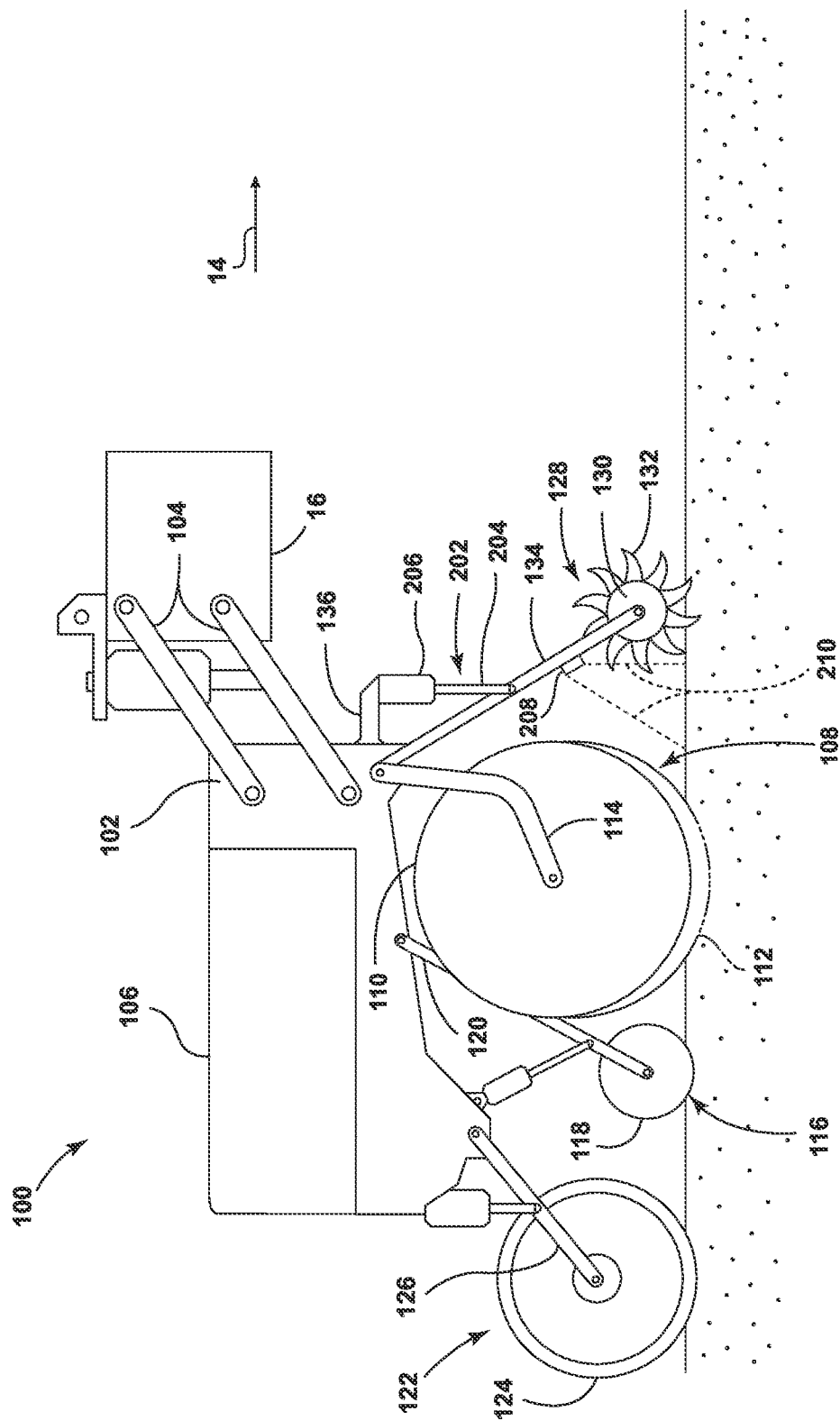
FIG. 2 illustrates a side view of one embodiment of a row unit of a seed-planting implement in accordance with aspects of the present subject matter.

FIG. 2 illustrates a side view of one embodiment of a row unit 100 of the seed-planting implement 10. As shown, the row unit 100 includes a row unit frame 102 is adjustably coupled to the toolbar 16 by links 104. For example, one end of each link 104 may be pivotably coupled to the row unit frame 102, while the opposed end of each link 104 may be pivotably coupled to the toolbar 16. However, in alternative embodiments, the row unit 100 may be coupled to the toolbar 16 in any other suitable manner. Furthermore, a hopper 106 may be coupled to or otherwise supported on the row unit frame 102 and configured to store seeds (e.g., that are received from a bulk storage tank). In addition, a seed-dispensing assembly (not shown) may be supported on the row unit frame 102 and configured to dispense seeds from the hopper 106 into the furrow being formed in the soil.

Moreover, the row unit 100 also includes a furrow opening assembly 108. For example, in one embodiment, the furrow opening assembly 108 may include a gauge wheel 110 and one or more disk openers 112 configured to excavate a furrow or trench in the soil. In general, the gauge wheel 110 is configured to engage the top surface of the soil as the implement 10 is moved across the field. As such, the height of the disk opener(s) 112 may be adjusted with respect to the position of the gauge wheel 110 to set the depth of the furrow being excavated. Furthermore, the furrow opening assembly 108 may include a support arm 114 configured to adjustably couple the gauge wheel 110 to the row unit frame 102. For example, one end of the support arm 114 may be rotatably coupled to the gauge wheel 110, while an opposed end of the support arm 114 may be pivotably coupled to the row unit frame 102. Additionally, the disk opener(s) 112 may be rotatably coupled (e.g., bolted) to the row unit frame 102. However, in alternative embodiments, the gauge wheel 110 and the disk opener(s) 112 may be coupled to the row unit frame 102 in any other suitable manner.

Moreover, the row unit 100 may include a furrow closing assembly 116. Specifically, in several embodiments, the furrow closing assembly 116 may include a pair of closing disks 118 (only one of which is shown) positioned relative to each other to permit soil to flow between the disks 118 as the implement 10 travels across the field. In this regard, the closing disks 118 are configured to close the furrow after seeds have been deposited therein, such as by collapsing the excavated soil into the furrow. Furthermore, the furrow closing assembly 116 may include a support arm 120 configured to adjustably couple the closing disks 118 to the row unit frame 102. For example, one end of the support arm 120 may be rotatably coupled to the closing disks 118, while the opposed end of the support arm 52 may be pivotably coupled to the row unit frame 102. However, in alternative embodiments, the closing disks 118 may be coupled to the row unit frame 102 in any other suitable manner. Moreover, in alternative embodiments, the furrow closing assembly 116 may include any other suitable components for closing the furrow, such as a pair of closing wheels (not shown).

Additionally, the row unit 100 may include a press wheel assembly 122. Specifically, in several embodiments, the press wheel assembly 122 may include a press wheel 124 configured to roll over the closed furrow to firm the soil over the seed and promote favorable seed-to-soil contact. Furthermore, the press wheel assembly 122 may include a support arm 126 configured to adjustably couple the press wheel 124 to the row unit frame 102. For example, one end of the support arm 126 may be rotatably coupled to the press wheel 124, while the opposed end of the support arm 126 may be pivotably coupled to the row unit frame 102. However, in alternative embodiments, the press wheel 124 may be coupled to the row unit frame 102 in any other suitable manner. Moreover, in some embodiments, the row unit 100 may not include the press wheel assembly 122.

Furthermore, the row unit 100 includes a row cleaner assembly 128 positioned forward of the disk opener(s) 112 relative to the direction of travel 14. In this regard, the row cleaner assembly 128 may be configured to break up and/or sweep away residue, dirt clods, trash, and/or other debris from path of the row unit 100 before the furrow is formed in the soil. For example, in one embodiment, the row cleaner assembly 128 may include one or more row cleaner wheels 130, with each wheel 130 having a plurality of tillage points or fingers 132. As such, the row cleaner wheel(s) 130 may be positioned such that the wheel(s) 130 roll relative to the surface of the field as the implement 10 travels across the field, thereby allowing the fingers 132 to break up and/or sweep away residue, dirt clods, trash, and/or other debris. Additionally, the row cleaner assembly 128 may include a row cleaner arm 134 configured to adjustably couple the row cleaner wheel(s) 130 to the row unit frame 102. For example, one end of the row cleaner arm 134 may be rotatably coupled to the row cleaner wheel(s) 130, while an opposed end of the row cleaner arm 134 may be pivotably coupled to the row unit frame 102.

In several embodiments, an actuator 202 may be configured to move or otherwise adjust the position of the row cleaner wheel(s) 130 relative to the surface of the field. Specifically, as shown, in one embodiment, a first end of the actuator 202 (e.g., a rod 204 of the actuator 202) may be coupled to the row cleaner arm 134 of the row cleaner assembly 128, while a second end of the actuator 202 (e.g., the cylinder 206 of the actuator 202) may be coupled to a row cleaner bracket 136, which is, in turn, coupled to the row unit frame 102. The rod 204 of the actuator 202 may be configured to extend and/or retract relative to the cylinder 206 to adjust the position of the row cleaner arm 134 relative to the row unit frame 102. Moving the row cleaner arm 134 relative to the row unit frame 102, in turn, adjusts the position of the row cleaner wheel(s) 130 relative to the surface of the field and, thus, the aggressiveness with which the wheel(s) 130 breaks up and sweeps away the debris. In the illustrated embodiment, the actuator 202 corresponds to a pneumatic cylinder. However, in alternative embodiments, the actuator 202 may correspond to any other suitable type of actuator, such as a hydraulic cylinder, an electric linear actuator, and/or the like.

It should be further appreciated that the configuration of the seed-planting implement described above and shown in FIGS. 1 and 2 is provided only to place the present subject matter in an exemplary field of use. Thus, it should be appreciated that the present subject matter may be readily adaptable to any manner of seed-planting configuration.

Additionally, the row unit 100 includes an optical flow sensor 208. In general, the optical flow sensor 208 is configured to generate data indicative of the movement of soil particles within the field relative to the seed-planting implement 10. As will be described below, the data generated by the optical flow sensor 208 is used to determine the aggressiveness with which the row cleaner wheel(s) 130 engage the surface of the field.

As shown in FIG. 2, the optical flow sensor 208 has a field of view (indicated by dashed lines 210) that allows for the generation of data indicative of the movement of soil particles after such particles have been engaged by the row cleaner assembly 128. Specifically, in several embodiments, the field of view 210 is positioned generally aft of the row cleaner wheel(s) 130 relative to the direction of travel 14. Additionally, in such embodiments, the field of view 210 may further be positioned forward of the disk opener(s) 112 relative to the direction of travel 14. As such, in one embodiment, the optical flow sensor 208 may be coupled to or otherwise supported on the row cleaner arm 134. However, in alternative embodiments, the optical flow sensor 208 may be coupled to or otherwise supported on any other suitable component of the row unit 100, such as the frame 102.

The optical flow sensor 208 may have any suitable configuration allowing for the generation of data that can be analyzed using optical flow technology. For example, in one embodiment, the optical flow sensor 208 may correspond to an image sensor configured to capture successive images of the portion of the field within its field of view 210. In this respect, and as will be described below, the successive images are compared to each other, thereby allowing the soil particles to be tracked from one image to the next using minimal computing resources.

Figure 3:
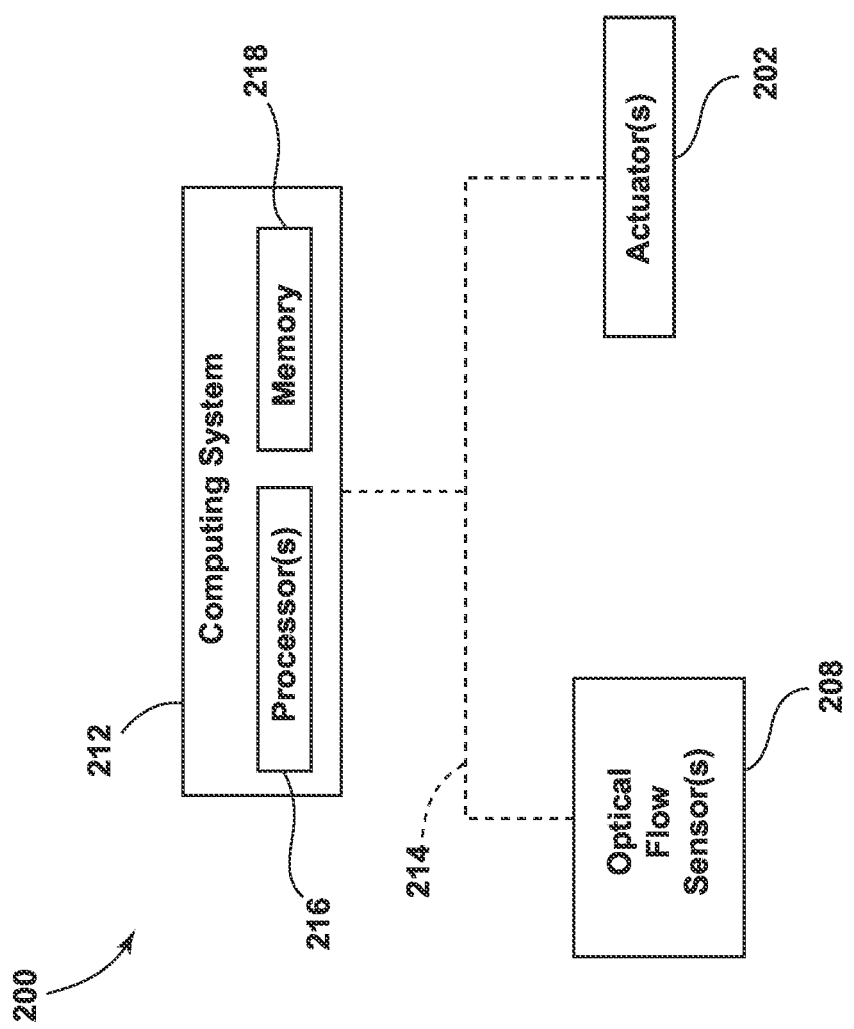
FIG. 3 illustrates a schematic view of one embodiment of a system for determining row cleaner aggressiveness of a seed-planting implement in accordance with aspects of the present subject matter.

Referring now to FIG. 3, a schematic view of one embodiment of a system 200 for determining row cleaner aggressiveness of a seed-planting implement is illustrated in accordance with aspects of the present subject matter. In general, the system 200 will be described herein with reference to the seed-planting implement 10 described above with reference to FIGS. 1 and 2. However, the disclosed system 200 may generally be utilized with seed-planting implements having any other suitable implement configuration.

As shown, the system 200 includes a computing system 212 communicatively coupled to one or more components of the seed-planting implement 10 and/or the system 200 to allow the operation of such components to be electronically or automatically controlled by the computing system 212. For instance, the computing system 212 may be communicatively coupled to the optical flow sensors 208 via a communicative link 214. As such, the computing system 212 may be configured to receive data from the optical flow sensor(s) 208 that is indicative of the movement of soil particles within the field relative to the seed-planting implement 10. Furthermore, the computing system 212 may be communicatively coupled to the actuator(s) 202 via the communicative link 214. In this respect, the computing system 212 may be configured to control the operation of the actuator(s) 202 to move row cleaner assembly(ies) 128 relative to the row unit frame 102 and the soil surface of the field. In addition, the computing system 212 may be communicatively coupled to any other suitable components of the seed-planting implement 10 and/or the system 200.

In general, the computing system 212 may comprise one or more processor-based devices, such as a given controller or computing device or any suitable combination of controllers or computing devices. Thus, in several embodiments, the computing system 212 may include one or more processor(s) 216 and associated memory device(s) 218 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 218 of the computing system 212 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 218 may generally be configured to store suitable computer-readable instructions that, when implemented by the processor(s) 216, configure the computing system 212 to perform various computer-implemented functions, such as one or more aspects of the methods and algorithms that will be described herein. In addition, the computing system 212 may also include various other suitable components, such as a communications circuit or module, one or more input/output channels, a data/control bus and/or the like.

The various functions of the computing system 212 may be performed by a single processor-based device or may be distributed across any number of processor-based devices, in which instance such devices may be considered to form part of the computing system 212. For instance, the functions of the computing system 212 may be distributed across multiple application-specific controllers or computing devices, such as a tractor/vehicle controller, an implement controller, and/or the like.

Figure 4:
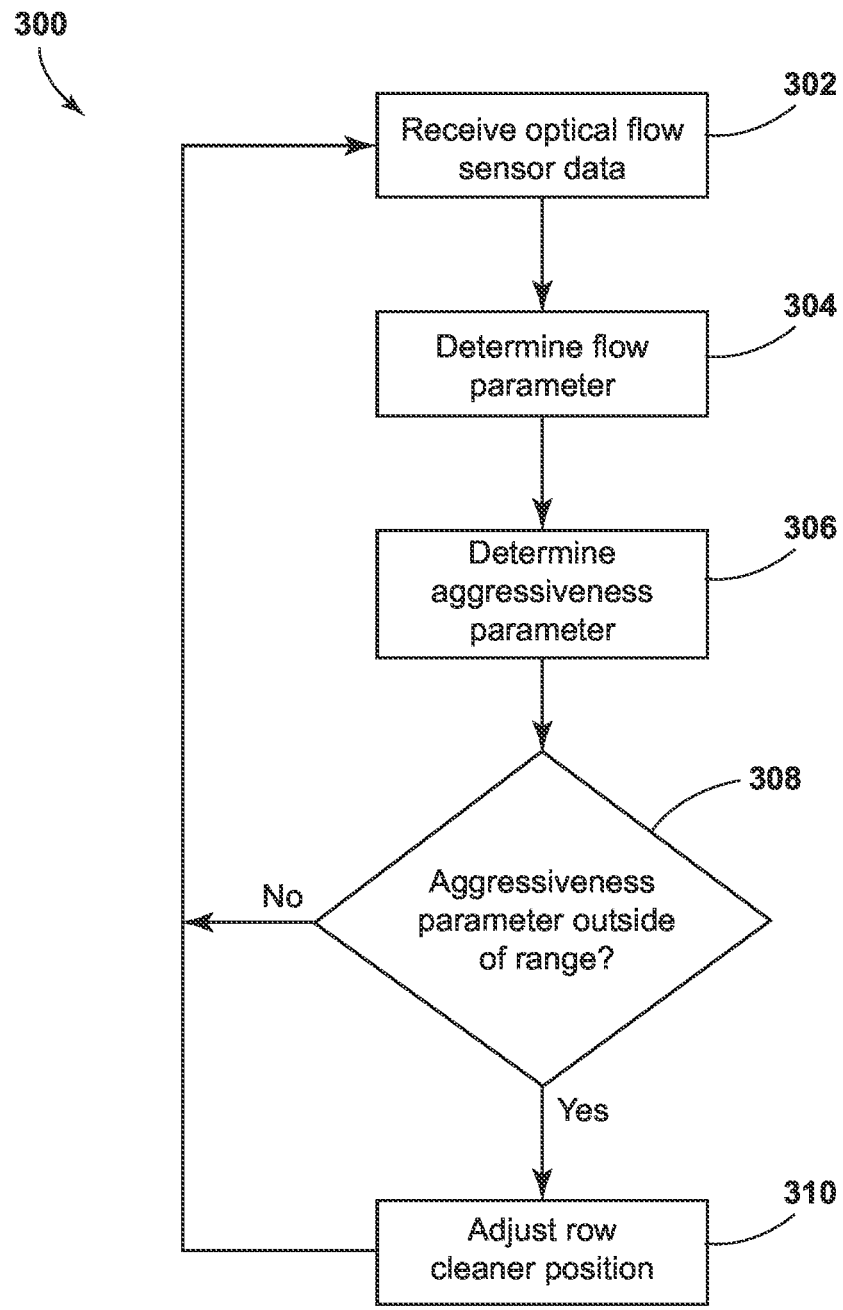
FIG. 4 illustrates a flow diagram providing one embodiment of control logic for determining row cleaner aggressiveness of a seed-planting implement in accordance with aspects of the present subject matter.

Referring now to FIG. 4, a flow diagram of one embodiment of control logic 300 that may be executed by the computing system 212 (or any other suitable computing system) for determining row cleaner aggressiveness of a seed-planting implement is illustrated in accordance with aspects of the present subject matter. Specifically, the control logic 300 shown in FIG. 4 is representative of steps of one embodiment of an algorithm that can be executed to determine row cleaner aggressiveness of a seed-planting implement. Such aggressiveness determination can then be used to maintain a target amount of engagement between the row cleaner wheel(s) and the soil surface as field conditions change. Thus, in several embodiments, the control logic 300 may be advantageously utilized in association with a system installed on or forming part of seed-planting implement to allow for real-time determination of row cleaner aggressiveness without requiring substantial computing resources and/or processing time. However, in other embodiments, the control logic 300 may be used in association with any other suitable system, application, and/or the like for controlling row cleaner operation on a seed-planting implement.

As shown in FIG. 4, at (302), the control logic 300 includes receiving optical flow sensor data indicative of the movement of soil particles within a field across which a seed-planting implement is traveling relative to the seed-planting implement. Specifically, as mentioned above, in several embodiments, the computing system 212 may be communicatively coupled to the one or more optical flow sensors 208 via the communicative link 214. In this respect, as the seed-planting implement 10 travels across the field to perform the seed-planting operation, the computing system 212 may receive data from the optical flow sensor(s) 208. Such data may, in turn, be indicative of the movement of soil particles within the field relative to the seed-planting implement 10.

As mentioned above, each row unit 100 of the seed-planting implement 10 may include an optical flow sensor 208. In this respect, the computing system 212 may receive optical flow sensor data indicative of the movement of soil particles relative to several or all of the row units 100 of the implement 10. As such, for purposes of clarity, (304)-(310) of the control logic 300 will be described below in the context of a single, given row unit 100. However, (304)-(310) of the control logic 300 may simultaneously be performed on any or all of the other row units 100 of the implement 10.

Furthermore, at (304), the control logic 300 includes determining a flow parameter associated with the movement of the soil particles relative to the seed-planting implement based on the received optical flow sensor data. Specifically, in several embodiments, the computing system 212 is configured to determine one or more flow parameters associated with the movement of the soil particles relative to the given row unit 100 of the implement 10 based on the data received from the corresponding optical flow sensor 208.

Figure 5:
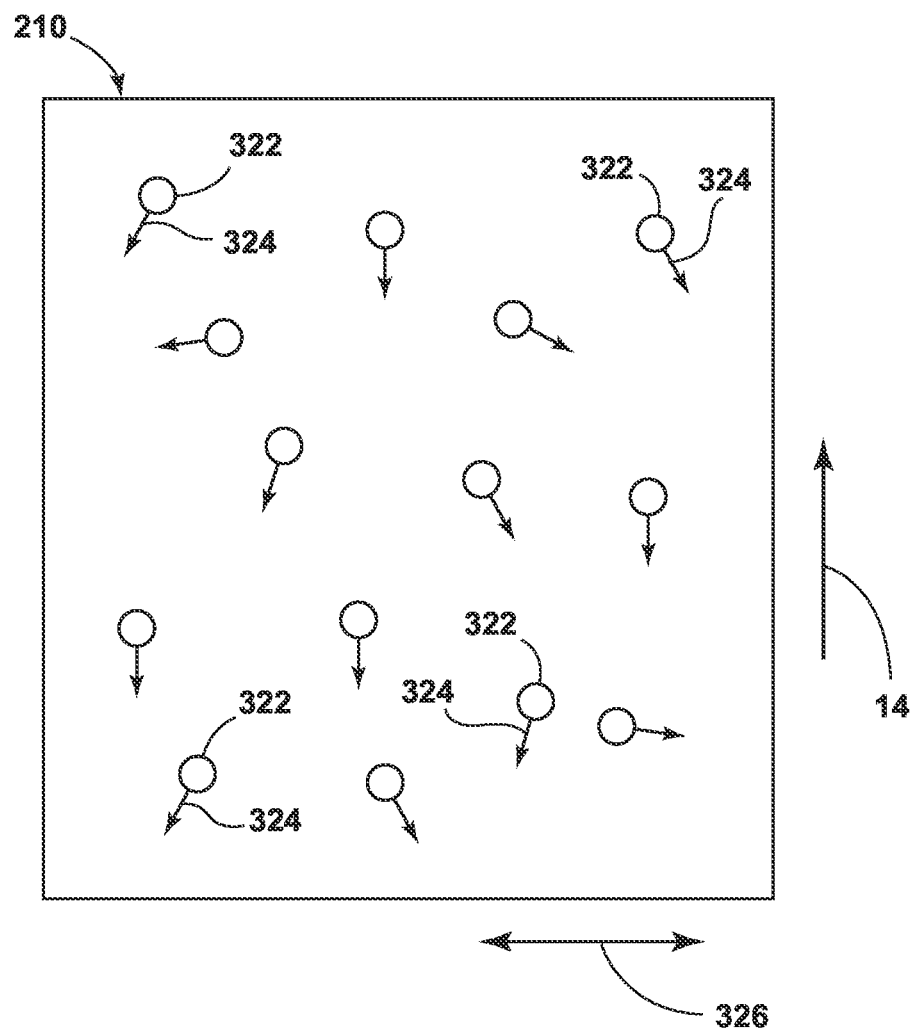
FIG. 5 illustrates a diagrammatic view of soil particles within a field of view of an optical flow sensor moving relative to a direction of travel of a seed-planting implement in accordance with aspects of the present subject matter.

As will be described below, the movement of the soil particles relative to the given row unit 100 is used to determine the aggressiveness of the corresponding row cleaner assembly 128. More specifically, as the seed-planting implement 10 travels across the field, the row cleaner wheel(s) 130 of the row cleaner assembly 128 of the given row unit 100 engages the soil within the field. Such engagement causes soil particles to move relative to the given row unit 100. For example, FIG. 5 is a diagrammatic view of soil particles within the field of view 210 of the optical flow sensor 208 of the given row unit 100. As such, soil particles 322 move relative to the direction of travel 14 of the implement 10 and, thus, the given row unit 100 (e.g., as indicated by arrows 324). Some soil particles 322 move parallel to the direction of travel 14 and other soil particles 322 move perpendicular to the direction of travel 14 in a crosswise direction (indicated by arrow 326). Additionally, further soil particles 322 move at an oblique angle relative to the direction of travel 14 and the cross-wise direction 322.

Referring again to FIG. 4, in several embodiments, at (304), the computing system 212 may use optical flow technology to determine the flow parameter(s) for the given row unit 100 based on the received optical flow sensor data. More specifically, as indicated above, the optical flow sensor 208 of the given row unit 100 may capture successive images of a portion of the field within its field of view 210. As such, each image shows positions of the soil particles relative to the corresponding row unit frame 102 after such soil particles have been engaged by the row cleaner wheel(s) 130 of the row cleaner 128. Thus, at (304), the computing system 212 may be configured to compare the successive images received from the optical flow sensor 208. In this respect, the computing system 212 may determine the movement of the soil particles relative to the row unit frame 102 by comparing the positions of the particles across the successive images. Optical flow technology allows the movement of the soil particles relative to the given row unit 100 to be tracked using significantly fewer computing resources than object classification algorithms.

The flow parameter(s) determined at (304) may correspond to any suitable parameter(s) indicative of the movement of the soil particles within the field of view 210 of the optical flow sensor 208. In general, such flow parameter(s) may be associated with the direction of flow of the soil particles. For example, in one embodiment, the flow parameter(s) correspond to a motion vector (e.g., a magnitude and direction) that is a composite of the movement of the soil particles within the field of view 210 of the optical flow sensor 208. That is, such a motion vector represents an average movement of all of the detected soil particles within the field of view 210. In another embodiment, the flow parameter(s) correspond to a plurality of motion vectors. In such an embodiment, each motion vector (e.g., a magnitude and direction) is associated of the movement of one of the soil particles within the field of view 210 of the optical flow sensor 208. Moreover, in a further embodiment, the flow parameter(s) correspond to a portion (e.g., a percentage) of the soil particles within the field of view 210 of the optical flow sensor 208 that is traveling in the crosswise direction 326.

In addition, at (306), the control logic 300 includes determining an aggressiveness parameter indicative of an amount of engagement between the row cleaner wheel and the surface of the field based on the determined flow parameter. Specifically, in several embodiments, the computing system 212 is configured to determine an aggressiveness parameter for the row cleaner assembly 128 of the given row unit 100 based on the flow parameter(s) determined at (304). As will be described below, the determined aggressiveness parameter may be used to control the operation of the actuator 202 of the given row unit 100.

In general, the flow or movement of the soil particles relative to the given row unit 100 of the seed-planting implement 10 is indicative of the aggressiveness of the row cleaner assembly 128 of the given row unit 100. More specifically, when the row cleaner assembly 128 of the given row unit 100 is lifted out of the soil such that the row cleaner wheel(s) 130 is not in contact with the soil, the soil particles within the field of view 210 of the optical flow sensor 208 generally all move parallel to the direction of travel 14. However, when the row cleaner wheel(s) 130 contacts the soil, some of the soil particles aft of the wheel(s) 130 begin to move in a direction that is not parallel to the direction of travel 14. As the aggressiveness of the row cleaner wheel(s) 130 increases, more and more soil particles begin to move in move in a direction that is not parallel to the direction of travel 14. Furthermore, as the aggressiveness of the row cleaner wheel(s) 130 increases, the difference in the directions of the soil particles and the direction of travel 14 of the implement 10 becomes greater. Thus, by using the flow parameter(s) determined at (304), the aggressiveness of the row cleaner assembly 128 can be determined. For example, the computing system 212 may use a suitable look up table stored within its memory device(s) 218 that correlates the flow parameter(s) to the aggressiveness parameter.

The aggressiveness parameter determined at (306) may correspond to any suitable parameter indicative of the amount of engagement between the row cleaner wheel(s) 130 and the surface of the field. For example, in some embodiments, aggressiveness parameter may correspond to the penetration depth of the tillage points 132 of row cleaner wheel(s) 130 into the field.

Additionally, at (308), the control logic 300 includes comparing the determined aggressiveness parameter to a predetermined range. Specifically, in several embodiments, the computing system 212 may compare the aggressiveness parameter determined at (306) for the row cleaner assembly 128 to a predetermined range. When the aggressiveness parameter determined for the row cleaner assembly 128 is within the predetermined range, the row cleaner assembly 128 is engaging the surface of the field with the desired aggressiveness, namely the row cleaner assembly 128 is sufficiently removing debris from the path of the row unit(s) without also removing the soil forming the seedbed. In such instances, the control logic 300 returns to (302). Conversely, when the aggressiveness parameter determined for the row cleaner assembly 128 falls outside of the predetermined range, the row cleaner assembly 128 is engaging the surface of the field either too aggressively (thereby sweeping away soil from the seedbed) or not aggressively enough (thereby leaving debris in the path of the row unit 100). In such instances, the control logic 300 proceeds to (310).

Additionally, at (310), the control logic 300 includes initiating an adjustment to the position of the row cleaner wheel relative to the surface of the field. Specifically, as mentioned above, in several embodiments, the computing system 212 may be communicatively coupled to the actuator 202 of the given row unit 100 via the communicative link 214. In this respect, when the determined aggressiveness parameter falls outside of the predetermined range, the computing system 212 may control the operation of the actuator 202 to adjust the position of the row cleaner arm 134 relative to the row unit frame 102. Such adjustment may, in turn, move the row cleaner wheel(s) 130 relative to the surface of the field to provide the desired engagement between the wheel(s) 130 and the surface of the field. Upon completion of (310), the control logic 300 returns to (302).

Figure 6:
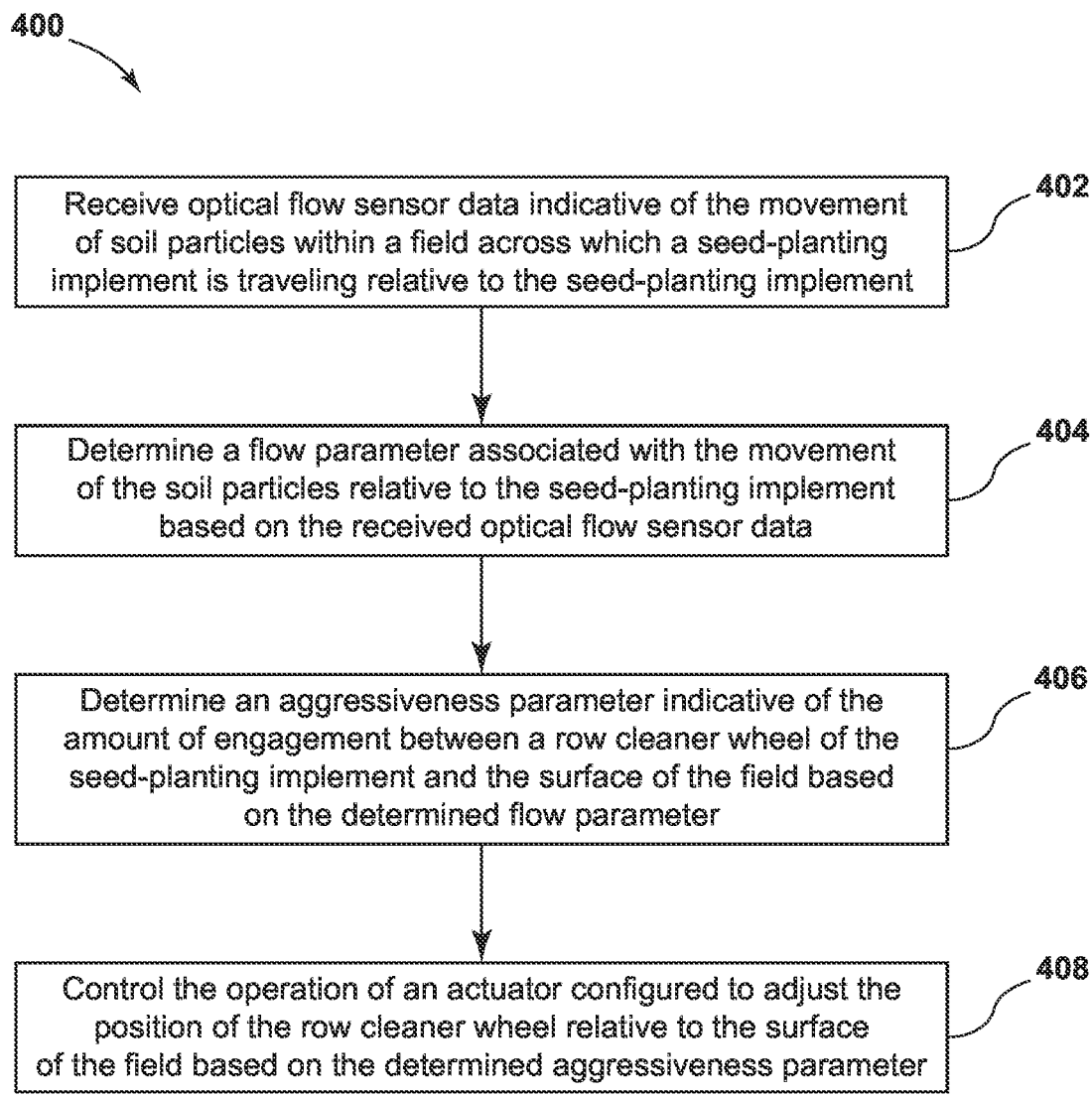
FIG. 6 illustrates a flow diagram of one embodiment of a method for determining row cleaner aggressiveness of a seed-planting implement in accordance with aspects of the present subject matter.

Referring now to FIG. 6, a flow diagram of one embodiment of a method 400 for determining row cleaner aggressiveness of a seed-planting implement is illustrated in accordance with aspects of the present subject matter. In general, the method 400 will be described herein with reference to the seed-planting implement 10 and the system 200 described above with reference to FIGS. 1-5. However, it should be appreciated by those of ordinary skill in the art that the disclosed method 400 may generally be implemented with any seed-planting implements having any suitable implement configuration and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (402), the method 400 may include receiving, with a computing system, optical flow sensor data indicative of the movement of soil particles within a field across which a seed-planting implement is traveling relative to the seed-planting implement. For instance, as described above, the computing system 212 is configured to receive data from the optical flow sensor(s) 208. Such data is, turn, indicative of the movement of soil particles within a field across which the seed-planting implement 10 is traveling relative to the seed-planting implement 10.

Additionally, at (404), the method 400 may include determining, with the computing system, a flow parameter associated with the movement of the soil particles relative to the seed-planting implement based on the received optical flow sensor data. For instance, as described above, the computing system 212 is configured to determine a flow parameter(s) associated with the movement of the soil particles relative to the seed-planting implement 10 based on the data received from the optical flow sensor(s) 208.

Moreover, as shown in FIG. 6, at (406), the method 400 may include determining, with the computing system, an aggressiveness parameter indicative of the amount of engagement between a row cleaner wheel of the seed-planting implement and the surface of the field based on the determined flow parameter. For instance, as described above, the computing system 212 may be configured to determine an aggressiveness parameter(s) indicative of the amount(s) of engagement between the row cleaner wheel(s) 130 and the surface of the field based on the determined flow parameter(s).

Furthermore, at (408), the method 400 may include controlling, with the computing system, the operation of an actuator configured to adjust the position of the row cleaner wheel relative to the surface of the field based on the determined aggressiveness parameter. For instance, as described above, the computing system 212 may be configured to control the operation of actuator(s) 202, which is configured to adjust the position(s) of the row cleaner wheel(s) 130 relative to the surface of the field, based on the determined aggressiveness parameter(s).

It is to be understood that the steps of the control logic 300 and the method 400 are performed by the computing system 212 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 212 described herein, such as the control logic 300 and the method 400, is implemented in software code or instructions which are tangibly stored on a tangible computer readable medium. The computing system 212 loads the software code or instructions via a direct interface with the computer readable medium or via a wired and/or wireless network. Upon loading and executing such software code or instructions by the computing system 212, the computing system 212 may perform any of the functionality of the computing system 212 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:
1. A seed-planting implement, comprising:
a toolbar;
a plurality of row units supported on the toolbar, each row unit comprising:
a frame;

a row cleaner assembly including a row cleaner arm pivotably coupled to the frame and a row cleaner wheel rotatably coupled to the row cleaner arm such that the row cleaner wheel is configured to roll relative to a surface of a field across which the seed-planting implement is traveling; and an optical flow sensor configured to generate data indicative of a movement of soil particles within the field relative to the seed-planting implement; and a computing system communicatively coupled to the optical flow sensor, wherein the computing system:

determines a plurality of motion vectors based on the data generated by the corresponding optical flow sensor, each motion vector of the plurality of motion vectors being associated with the movement of one of the soil particles within a field of view of the optical flow sensor;

determines an aggressiveness parameter indicative of an amount of engagement between the row cleaner wheel and the surface of the field for each row unit based on the corresponding determined plurality of motion vectors.

2. The seed-planting implement of claim 1, wherein the data generated by the optical flow sensor is indicative the movement of the soil particles within the field of view of the optical flow sensor relative to the seed-planting implement, the field of view being positioned aft of the row cleaner wheel relative to a direction of travel of the seed-planting implement.

3. The seed-planting implement of claim 2, wherein each row unit further comprises:

a disk opener rotatably coupled to the frame and positioned aft of the row cleaner assembly relative to the direction of travel, the disk opener configured to form a furrow within the field, wherein the field of view is further positioned forward of the disk opener relative to the direction of travel.

4. The seed-planting implement of claim 1, wherein the optical flow sensor is coupled to the row cleaner arm.

5. A system for determining row cleaner aggressiveness of a seed-planting implement, the system comprising:

a frame;

a row cleaner assembly including a row cleaner arm pivotably coupled to the frame and a row cleaner wheel rotatably coupled to the row cleaner arm such that the row cleaner wheel is configured to roll relative to a surface of a field across which the seed-planting implement is traveling;

an optical flow sensor configured to generate data indicative of a movement of soil particles within the field relative to the seed-planting implement; and a computing system communicatively coupled to the optical flow sensor, wherein the computing system:

determines a plurality of motion vectors based on the data generated by the corresponding optical flow sensor, each motion vector of the plurality of motion vectors being associated with the movement of one of the soil particles within a field of view of the optical flow sensor; and determines an aggressiveness parameter indicative of an amount of engagement between the row cleaner wheel and the surface of the field based on the determined plurality of motion vectors.

6. The system of claim 5, wherein the data generated by the optical flow sensor is indicative the movement of the soil particles within the field of view of the optical flow sensor relative to the seed-planting implement, the field of view being positioned aft of the row cleaner wheel relative to a direction of travel of the seed-planting implement.

7. The system of claim 6, further comprising:

a disk opener rotatably coupled to the frame and positioned aft of the row cleaner assembly relative to the direction of travel, the disk opener configured to form a furrow within the field, wherein the field of view is further positioned forward of the disk opener relative to the direction of travel.

8. The system of claim 5, wherein when determining the aggressiveness parameter, the computing system determines a composite motion vector that is a composite of plurality of motion vectors.

9. The system of claim 5, wherein when determining the aggressiveness parameter, the computing system determines a portion of the soil particles within the field of view of the optical flow sensor that is traveling in a crosswise direction relative to the direction of travel based on the plurality of motion vectors.

10. The system of claim 5, wherein the row cleaner wheel comprises a plurality of tillage points, the aggressiveness parameter corresponding to a penetration depth of the plurality of tillage points into the field.

11. The system of claim 5, further comprising:

an actuator coupled between the row cleaner arm and the frame, the actuator configured to adjust a position of the row cleaner wheel relative to the surface of the field, wherein the computing system controls an operation of the actuator based on the determined aggressiveness parameter.

12. The system of claim 11, wherein, when controlling the operation of the actuator, the computing system is configured to:

compares the determined aggressive parameter to a predetermined range; and initiates an adjustment to the position of the row cleaner wheel relative to the surface of the field when the determined aggressive parameter falls outside of the predetermined range.

13. The system of claim 5, wherein:

the optical flow sensor is configured to capture successive images of the surface of the field within a field of view of the optical sensor; and when determining the plurality of motion vectors, the computing system compares the successive images captured by the optical flow sensor.

14. A method for determining row cleaner aggressiveness of a seed-planting implement, the seed-planting implement including a row cleaner assembly having a row cleaner arm pivotably coupled to a frame of the seed-planting implement, the row cleaner assembly further including a row cleaner wheel rotatably coupled to the row cleaner arm, the method comprising:

receiving, with a computing system, optical flow sensor data indicative of a movement of soil particles within a field across which the seed-planting implement is traveling relative to the seed-planting implement;

determining, with the computing system, a plurality of motion vectors based on the received optical flow sensor data, each motion vector of the plurality of motion vectors being associated with the movement of one of the soil particles within a field of view of the optical flow sensor;

determining, with the computing system, an aggressiveness parameter indicative of an amount of engagement between the row cleaner wheel and the surface of the field based on the determined plurality of motion vectors; and controlling, with the computing system, an operation of an actuator configured to adjust a position of the row cleaner wheel relative to the surface of the field based on the determined aggressiveness parameter.

15. The method of claim 14, wherein determining the aggressiveness parameter comprises determining, with the computing system, a composite motion vector that is a composite of sensor the plurality of motion vectors.

16. The method of claim 14, wherein the row cleaner wheel comprises a plurality of tillage points, the aggressiveness parameter corresponding to a penetration depth of the plurality of tillage points into the field.

17. The method of claim 14, wherein controlling the operation of the actuator comprises:

comparing, with the computing system, the determined aggressive parameter to a predetermined range; and initiating, with the computing system, an adjustment to the position of the row cleaner wheel relative to the surface of the field when the determined aggressive parameter falls outside of the predetermined range.

* * * * *